United States Patent
Raposa et al.

(10) Patent No.: US 6,498,476 B1
(45) Date of Patent: *Dec. 24, 2002

(54) UNDERWATER HIGH SPEED PROJECTILE SPEED SENSING DEVICE

(75) Inventors: John R. Raposa, Warren, RI (US); Daniel P. Thivierge, Warren, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 09/565,234

(22) Filed: Apr. 28, 2000

(51) Int. Cl.[7] ............................... G01P 3/66; G01P 3/80
(52) U.S. Cl. .......................................... 324/178; 73/167
(58) Field of Search ......................... 324/178, 179, 324/180; 73/167

(56) References Cited

U.S. PATENT DOCUMENTS 3,222,596 A * 12/1965 Mayer et al. ............... 324/180
3,493,856 A * 2/1970 Wilson ....................... 324/180

* cited by examiner

Primary Examiner—Walter E. Snow
(74) Attorney, Agent, or Firm—Michael J. McGowan; James M. Kasischke; Michael F. Oglo

(57) ABSTRACT

A device for sensing projectile velocity in an underwater environment is provided. The device includes a plurality of evenly spaced break screen members positioned in a path of the projectile. Each break screen member includes a support member, a pair of transparent sheets spanning the support member, a continuous resistive trace sandwiched between the transparent sheets, and a sensing member correspondingly connected to each resistive trace. The sensing member includes means for outputting a signal responsive to impact of the projectile against the break screen, and a logic arrangement for determining a difference between impact of at two adjacent break screens throughout the run of break screens, thereby determining a velocity of the projectile.

9 Claims, 2 Drawing Sheets

UNDERWATER HIGH SPEED PROJECTILE SPEED SENSING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to an underwater high speed projectile break screen based speed sensing circuit for the adaptable high speed underwater munition (AHSUM) project. More particularly, the invention relates to a sensing circuit for providing a state output of a break screen used in the testing of an underwater projectile. A resistive trace is placed in a plastic break screen. The resistive trace is coupled to a voltage divider and voltage comparator. Before the resistive trace is broken, a low signal is output from the comparator. When the resistive trace is broken, a high signal is output from the comparator. The comparator output is coupled to a programmable array logic (PAL) device which is configured to latch the high input signal and output the same for use by a data acquisition system.

(2) Description of the Prior Art

The known Adaptable High Speed Underwater Munition (ANSUM) project needed a method to sense the speed of underwater projectiles during the course of their test series, and particularly a calculation of the velocity of a projectile traveling at high rates of speed in an underwater firing range.

Previously, there was a need for a special material such as magnets in the projectile in order to obtain the necessary results. Thus, a problem exists in the art whereby there is a need for a break screen and sensing device which eliminates the need for special materials of the prior art.

The following patents, for example, disclose various types of break screens and velocity measuring systems, but do not disclose a device for sensing projectile velocity according to the aspects of the present invention.

U.S. Pat. No. 2,713,262 to Webster;
U.S. Pat. No. 3,656,056 to Dalzell, Jr.;
U.S. Pat. No. 3,792,354 to Slaght et al;
U.S. Pat. No. 4,128,761 to Oehler;
U.S. Pat. No. 4,845,690 to Oehler;
U.S. Pat. No. 5,349,853 to Oehler; and
U.S. Pat. No. 5,778,725 to Kirschner et al.

specifically, the patent to Webster discloses a method and apparatus for testing single samples of armor such as body armor. The ballistic apparatus and process of ballistic testing of the invention is designed to facilitate ballistic testing of armor specimens, to test single armor samples with a minimum of equipment, to yield comparative data between the test sample and aluminum or steel, and to yield information on the potential damage behind the armor plate. The ballistic apparatus and process reverses the usual laboratory procedure of firing a bullet at various velocities against a number of samples, and utilizes a gun shooting a bullet of known weight at a predetermined fixed velocity against a single unknown sample which is backed up by sheets of a standard material. In particular, the apparatus tests an armor plate with a projectile to determine the penetration resistance value of the armor plate to the projectile. The apparatus includes a plurality of centrally apertured frame members, means connecting the frame members in facing relationship with their central apertures in substantial registration, a test sample armor plate disposed between an end frame member and the next frame member, and a plurality of standard plates disposed between consecutive frame members from the next frame member.

The patent to Dalzell, Jr. discloses a resistance type of bullet hole locator in which the point at which a bullet or other passing object passed a line may be determined. Or, the direction from which the object came is ascertained by comparing the points at which the object passed spaced-apart lines or planes. Electrical resistance type elements, connected to an indicator or computer, indicate the points at which the object passed two or more lines or planes. As exemplary, one can determine the direction a bullet came from which struck a helicopter.

Slaght et al. discloses a system and method for determining the relative velocities of a projectile at different portions of its path in which a plurality of signaling detector stations are arranged at predetermined intervals along such path. A common receiving station is arranged to receive signals from the detector stations through a common communication channel. The receiving station has a memory unit capable of storing pulses corresponding to the signals received, and a calculator capable of analyzing adjacent pairs of the pulses which have been produced by passage of the projectile over two or more of the path intervals monitored by the detector stations. These features allow determination of the relative velocities of the projectile as it traverses the path intervals monitored by different pairs of detector stations. This information is used to study retardation properties of a projectile.

Oehler '761 discloses a photodetector circuit for ballistic velocity measurement. Light perturbations sequentially produced by a projectile at spaced points are detected by photodetectors connected to a logarithmic diode circuit which is AC coupled to an amplifier time-shared by the detectors. Successive pulses from the amplifier are interpreted by logic circuits to start and stop an interval counter.

The '690 patent to Oehler discloses a multiple screen ballistic chronograph. The chronograph system includes three shot-sensing screens which provide start and stop signals to interval-determining timers. The first screen provides a start signal to both timers and the subsequent screens provide stop signals to the first and second timers, respectively. The time intervals measured by these timers are divided into the distances between the screens to separately calculate two velocities based on two different distances. The calculated velocities are compared to evaluate the performance of the instrumentation so that measurement errors resulting from the instrumentation itself can be eliminated from analysis of the test shots.

The Oehler '853 patent discloses an apparatus and method for measuring and calculating exterior and interior ballistics in a firearm. The apparatus includes a device for measuring pressure in a firearm-firing-chamber disposed at least in part at the strain sensitive region, and for producing analog signals indicative of the pressure, and connected to digitizing circuits which record the amplitudes of the signals representing pressure as a function of time; a plurality of muzzle bullet sensors for measuring the relative times at which the bullet passes the plane of each sensor and for producing analog signals indicative of these times, the analog signals being converted to digital signals and connected to digital timing circuits; and an acoustic target located downrange and including sensors arrayed at corners of a triangle for sensing acoustic energy emitted by a passing bullet and a device for generating analog signals representative of the acoustic energy sensed at the triangle corners.

The patent to Kirshner et al. discloses an assembly and method for testing an underwater gun. The test assembly is disposed in a tank of liquid and includes a mount for accepting and retaining the gun to be tested, a plurality of baffle plates, each having an aperture therethrough for alignment with a muzzle portion of the gun, a plurality of witness screens for alignment with the gun muzzle portion, a plurality of motion detection sensors for alignment with the apertures of the baffle plates, and a bullet receptacle for alignment with the gun muzzle portion for receiving a bullet fired from the gun. The device further contemplates a method for testing underwater guns, utilizing the assembly.

It should be understood that the present invention would in fact enhance the functionality of the above patents by providing a simplified device for sensing projectile velocity in an underwater environment in which each of at least two spaced break screen members are connected to a corresponding sensor, the sensor outputting a latched signal, and the latched signals being used to determine a velocity between the at least two spaced break screen members.

SUMMARY OF THE INVENTION

Therefore it is an object of this invention to provide a device for sensing projectile velocity.

Another object of this invention is to provide a device for sensing projectile velocity in an underwater environment.

Still another object of this invention is to provide a device for sensing projectile velocity in an underwater environment which utilizes a plurality of individually monitored break screens, each connected to a data acquisition system.

A still further object of the invention is to provide circuitry which is an accurate and inexpensive method to measure the velocity of a projectile under the water.

Yet another object of this invention is to provide a device for sensing projectile velocity in an underwater environment which is simple to manufacture and easy to use. In accordance with one aspect of this invention, there is provided a device for sensing projectile velocity in an underwater environment. The device includes a plurality of evenly spaced break screen members positioned in the path of a projectile. Each break screen member includes a support member, a pair of transparent sheets spanning the support member, a continuous resistive trace sandwiched between the transparent sheets, and a sensing member correspondingly connected to each resistive trace. The sensing member includes means for outputting a signal responsive to impact of the projectile against the break screen, and a logic arrangement for determining a difference between impact of two adjacent break screens throughout the run of break screens, thereby determining a velocity of the projectile.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to a method and device for sensing a speed of an underwater projectile during underwater testing in the Adaptable High Speed Underwater Munition (AHSUM) project.

Figure 1:
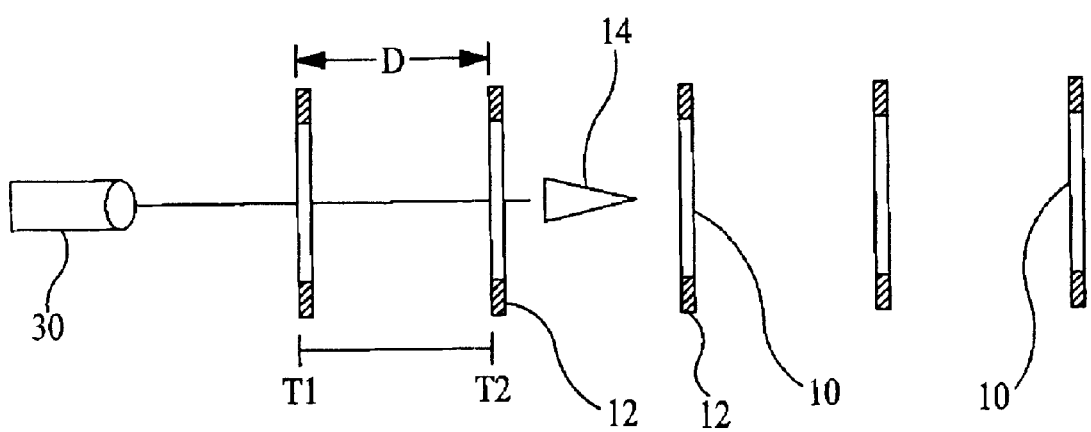
FIG. 1 is a side plan view of a first preferred embodiment of the present invention.
Figure 2:
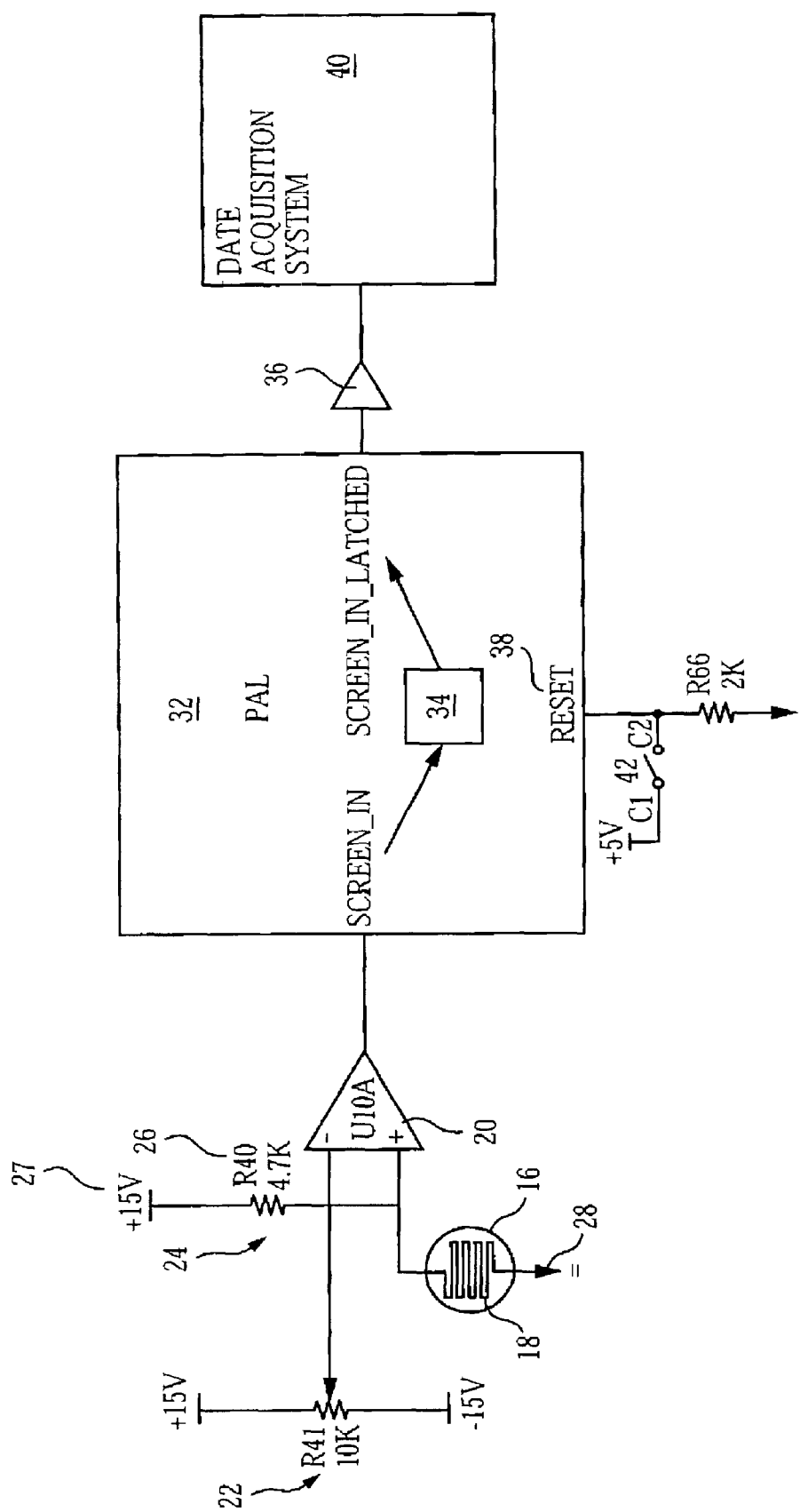
FIG. 2 is a diagrammatic view of the circuitry used in the preferred embodiment of the invention.

The testing utilizes both a break screen arrangement as shown in FIG. 1 and a sensing device used in connection with the break screens as shown more particularly in FIG. 2.

Referring first to FIG. 1, there is shown a plurality of break screen members 10. Each break screen 10 includes at least a steel plate 12 having an opening formed therein for passage of a projectile 14 therethrough as discharged from a gun 30. The opening may be of any shape suitable for a clean passage of the projectile 14, however, a circular opening was utilized in actual testing of the device. The steel plate 12 is not only used as a fastening surface for the break screen 10, but as a barricade to protect the surrounding facility and personnel in the event the projectile 14 strays off course.

The break screen 10 is further constructed of clear plastic sheets or film 16, similar to a transparency. A continuous resistive trace 18 winds its way back and forth from one side of the film 16 to the other and is sandwiched between two of the sheets of film 16. It is understood that alternative forms of capture and/or windings of the continuous resistive trace 18 may be used in connection with one or more of the sheets of film 16, and such modifications are intended to be included within the scope of the invention. Both ends of the resistive trace 18 are connected to the input of the control circuitry shown in further detail in FIG. 2 and described more fully in the following. Each break screen 10 is electrically joined to a similar one of the control circuits of FIG. 2.

With regard to the arrangement shown in FIG. 1, the device for sensing projectile velocity preferably utilizes a plurality of break screens 10. In FIG. 1 there are a series of five break screens 10, all spaced a predetermined distance D apart. By shooting the projectile 14 through a series of break screens 10, set up along the full length of the underwater firing range, the test engineers can measure the time interval between consecutive screens 10 in order to measure velocity of the projectile 14. The velocity of the projectile 14 is ultimately found by measuring the time (T2–T1) to travel the distance D between two consecutive break screens 10.

Referring now more specifically to the diagram of FIG. 2, there is shown the sensing and control circuitry for use in the present invention. The sensing and control circuitry processes the state of the break screens 10.

The first portion of the sensing and control circuit contains a voltage comparator 20, for example an LP365A voltage comparator manufactured by National Semiconductor. The negative input of the comparator 20 is connected to a potentiometer voltage divider 22 that provides a threshold voltage at which an output of the comparator 20 will change. The positive input of the comparator 20 is connected to a midpoint of a two-resistor voltage divider 24. The two resistor voltage divider 24 is made up of a fixed resistance pull-up resistor 26 (and its associated positive (15 Volt) power source 27) and the break screen connected to circuit ground 28. The resistance of the break screen 10 is approximately 1 Kohm before being broken by the projectile 14 and increases by a few orders of magnitude after being punctured. If the break screen 10 were in air, the resistance would be infinite (open circuit), but in water the resistance is finite due to the conductivity of the water.

While the break screen 10 is intact, prior to impact by the projectile 14, the comparator 20 outputs a low signal (0 Volts). Immediately following impact of the projectile 14 on the break screen 10, the break screen opens, thus opening the bottom half of the potentiometer voltage divider 22 allowing the positive input to the comparator 20 to be pulled high. This causes the comparator 20 to output a high signal (5 Volts). The comparator output signal labeled SCREEN_IN is input to a programmable array logic device (PAL) 32.

The PAL 32 contains discrete logic devices (not shown) that can be programmed and reconfigured. The SCREEN_IN input signal is sent to the clock input of a D-flip-flop 34 that is-programmed internally in the PAL 32. A stand alone D-flip-flop could be used for this purpose. The D-input of the flip-flop 34 is permanently connected to a predetermined voltage, such as a high voltage (5 Volts). The purpose of the D-flip-flop 34 is to provide a latched 5 Volt signal when the break screen 10 is broken and prevent the output of the PAL 32 from changing in the event of glitches at the PAL input. The output of the flip-flop 34 is labeled as SCREEN_IN_LATCHED. This signal is output from the PAL 32 and sent through a buffer 36 such as a 74LS244 buffer manufactured by Texas Instruments. Buffer 36 output us joined to the input of a data acquisition system 40. Buffer 36 provides the appropriate drive current for the data acquisition system 40, and the PAL 32 in the event the output of the PAL 32 is shorted.

The data acquisition system 40 is joined to receive a latched high signal for each of the break screen channels from the buffer 36 output associated with each screen 10. As the projectile 14 passes through successive break screens 10, the latched signals will be delayed in time. As shown in FIG. 1, by subtracting the time between two successive break screens (T2–T1) a velocity can be calculated over a distance (D). This process is repeated over the length of the entire run of break screens 10 in order to measure the speed of the projectile from the muzzle of the gun to the end of the test range. The output of the latch remains high until a reset signal is provided to the PAL 32 via an external manual switch 42 connected to a RESET input 38 of the PAL 32.

The present invention allows for the measurement and calculation of the velocity of a projectile traveling at high rates of speed in an underwater firing range. The use of break screens eliminates the need for the use of special material such as magnets in the projectile.

In addition, the device of the present invention provides an accurate and inexpensive means to measure the velocity of a projectile under the water. The comparator trigger level can be adjusted by potentiometer voltage divider 22 to accommodate alternate trace 18 designs.

Still further, the use of a programmable array logic device allows for easy implementation of design logic changes including output polarity and an addition of digital filtering without having to redesign the sensing circuit or the printed circuit board.

Alternatives to the embodiment shown include the use of a sensing coil around the plate instead of a break screen in order to sense the projectile passing through the plate. The projectile would be either constructed from magnetic material or have a magnetic insert.

Finally, it is anticipated that the invention herein will have far reaching applications other than those of underwater projectile testing projects.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A device for sensing projectile velocity comprising:

at least two support members positioned in a path of said projectile, and defining an opening at said path;

at least one sheet joined to each support member spanning said support member;

a continuous resistive trace fixed to said at least one sheet;

a sensing circuit connected to each said resistive trace, said sensing circuit outputting a signal responsive to separation of said resistive trace; and a logic arrangement joined to each sensing circuit output, said sensing circuit including:

an electrical ground;

a power source having positive and negative inputs and an output responsive to said positive and negative inputs;

a potentiometer voltage divider joined between said positive voltage terminal and said negative voltage terminal connected to the negative input of said voltage comparator;

a two resistor voltage divider joined between said positive voltage terminal and said electrical ground, said resistive trace serving as one of said two resistors connected to the positive input of said voltage comparator; and a D-flip-flop having a d input joined to a logical high voltage, a clock input joined to said voltage comparator output and a flip-flop output providing a steady signal in response to said comparator output signal, said logic arrangement comprising a data acquisition system joined to receive said steady signal from each of a plurality of D-flip-flop outputs, and determining a difference in a time of projectile impacts between two of any of said at least two break screen members.

2. The device according to claim 1 wherein said at least two support members are positioned a predetermined distance apart.

3. The device according to claim 1 wherein said D-flip-flop comprises an internally programmed D-flip-flop in a programmable array logic device.

4. The device according to claim 3 further comprising a buffer member positioned between said programmable array logic device and said data acquisition system.

5. The device according to claim 1 further comprising a buffer member positioned between the latched output of said D-type flip-flop and said data acquisition system.

6. The device according to claim 1 wherein said continuous resistive trace is fixed between two transparent sheets.

7. The device according to claim 1 further comprising an external manual switch connected to a reset input of said programmable array logic and internal D-type flip-flop.

8. The device according to claim 7 wherein said reset input returns said latched output signal of said programmable array logic to said power up state of 0 Volts.

9. The device according to claim 1 wherein said device is underwater.

* * * * *